US012584937B2

(12) United States Patent
Jin

(10) Patent No.:    US 12,584,937 B2
(45) Date of Patent:      Mar. 24, 2026

(54) SENSOR UNIT WITH DUAL OVERLAPPING MODULES

(71) Applicant: SEIKO EPSON CORPORATION, Tokyo (JP)

(72) Inventor: Mikimoto Jin, Ina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 241 days.

(21) Appl. No.: 18/194,789

(22) Filed: Apr. 3, 2023

(65) Prior Publication Data

US 2023/0314461 A1     Oct. 5, 2023

(30) Foreign Application Priority Data

Apr. 5, 2022    (JP) .................................. 2022-062794

(51) Int. Cl.
*G01P 3/44*          (2006.01)
*G01P 15/125*        (2006.01)
*G01P 15/18*         (2013.01)

(52) U.S. Cl.
CPC .............. *G01P 3/44* (2013.01); *G01P 15/125* (2013.01); *G01P 15/18* (2013.01)

(58) Field of Classification Search
CPC ....................................................... G01P 3/44
USPC ......................................................... 73/511
See application file for complete search history.

(56) References Cited

U.S. PATENT DOCUMENTS

2021/0190816 A1*   6/2021   Jin ........................... G01P 15/18

FOREIGN PATENT DOCUMENTS

JP          6629691 B2 *   1/2020   ............. G01C 19/00
JP      2021-99232 A       7/2021

OTHER PUBLICATIONS

Maeda et al. Machine Translation of JP-6629691-B2. Published Jan. 2020. Translated Jan. 2025. (Year: 2020).*

* cited by examiner

*Primary Examiner* — Walter L Lindsay, Jr.
*Assistant Examiner* — Philip T Fadul
(74) *Attorney, Agent, or Firm* — Rankin, Hill & Clark LLP

(57)         ABSTRACT

A sensor unit includes: a substrate including a first coupling portion disposed on a first surface and a second coupling portion disposed on a second surface; a first sensor module including a first coupled portion that is located on a side close to the first surface and that is coupled to the first coupling portion, a first acceleration sensor, and a first angular velocity sensor; and a second sensor module including a second coupled portion that is located on a side close to the second surface and that is coupled to the second coupling portion, a second acceleration sensor, and a second angular velocity sensor.

9 Claims, 13 Drawing Sheets

SENSOR UNIT WITH DUAL OVERLAPPING MODULES

The present application is based on, and claims priority from JP Application Serial Number 2022-062794, filed on Apr. 5, 2022, the disclosure of which is hereby incorporated by reference herein in its entirety.

BACKGROUND

1. Technical Field

The present disclosure relates to a sensor unit.

2. Related Art

For example, JP-A-2021-099232 discloses a sensor unit including a substrate and two sensor modules disposed on the substrate. According to such a configuration, an SN ratio can be improved according to a square root of the number of sensor modules. Further, JP-A-2021-099232 discloses a method for minimizing a centrifugal force error of an acceleration sensor by disposing the two sensor modules facing each other via the substrate and disposing acceleration sensors respectively provided in the sensor modules in the same quadrant in a plan view of the substrate.

However, the sensor unit is required to have higher accuracy.

SUMMARY

A sensor unit according to an aspect of the present disclosure includes: a substrate including a first surface and a second surface, which are in a front and back relationship, and including a first coupling portion disposed on the first surface and a second coupling portion disposed on the second surface; a first sensor module disposed on the first surface, and including a first coupled portion that is located on a side close to the first surface and that is coupled to the first coupling portion, a first acceleration sensor, and a first angular velocity sensor; and a second sensor module disposed on the second surface, and including a second coupled portion that is located on a side close to the second surface and that is coupled to the second coupling portion, a second acceleration sensor, and a second angular velocity sensor.

DESCRIPTION OF EXEMPLARY EMBODIMENTS

Hereinafter, a sensor unit according to an aspect of the present disclosure will be described in detail based on embodiments shown in the accompanying drawings.

First Embodiment

Figure 1:
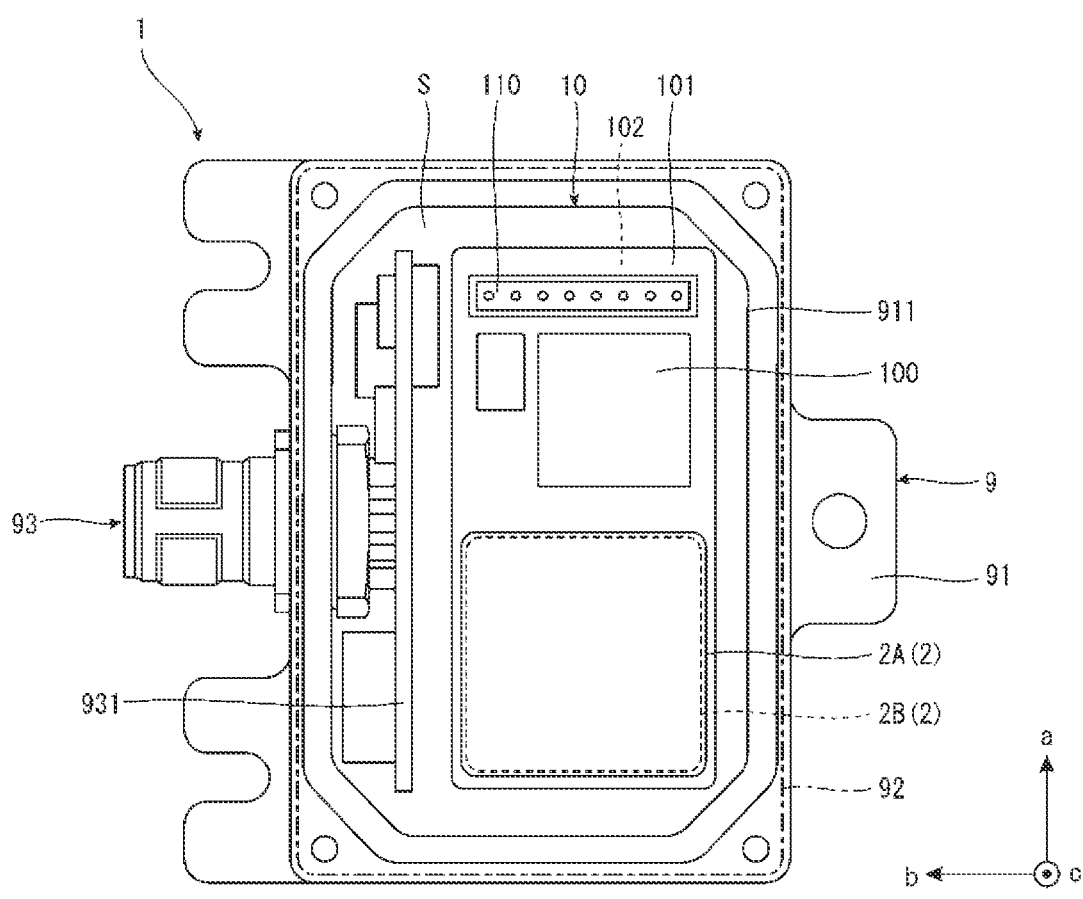
FIG. 1 is a plan view showing a sensor unit according to a first embodiment.
Figure 2:
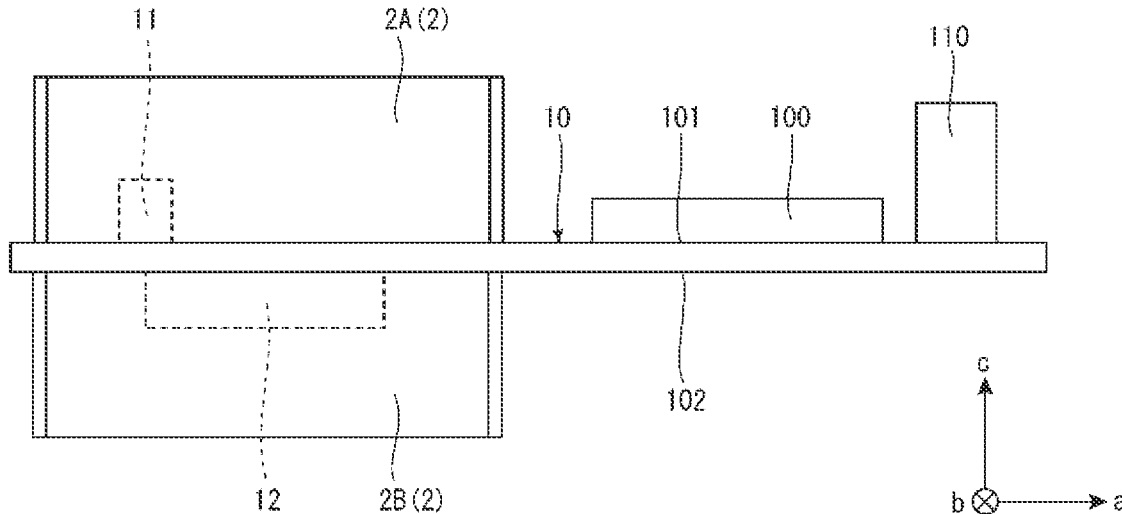
FIG. 2 is a side view showing a substrate provided in the sensor unit.
Figure 3:
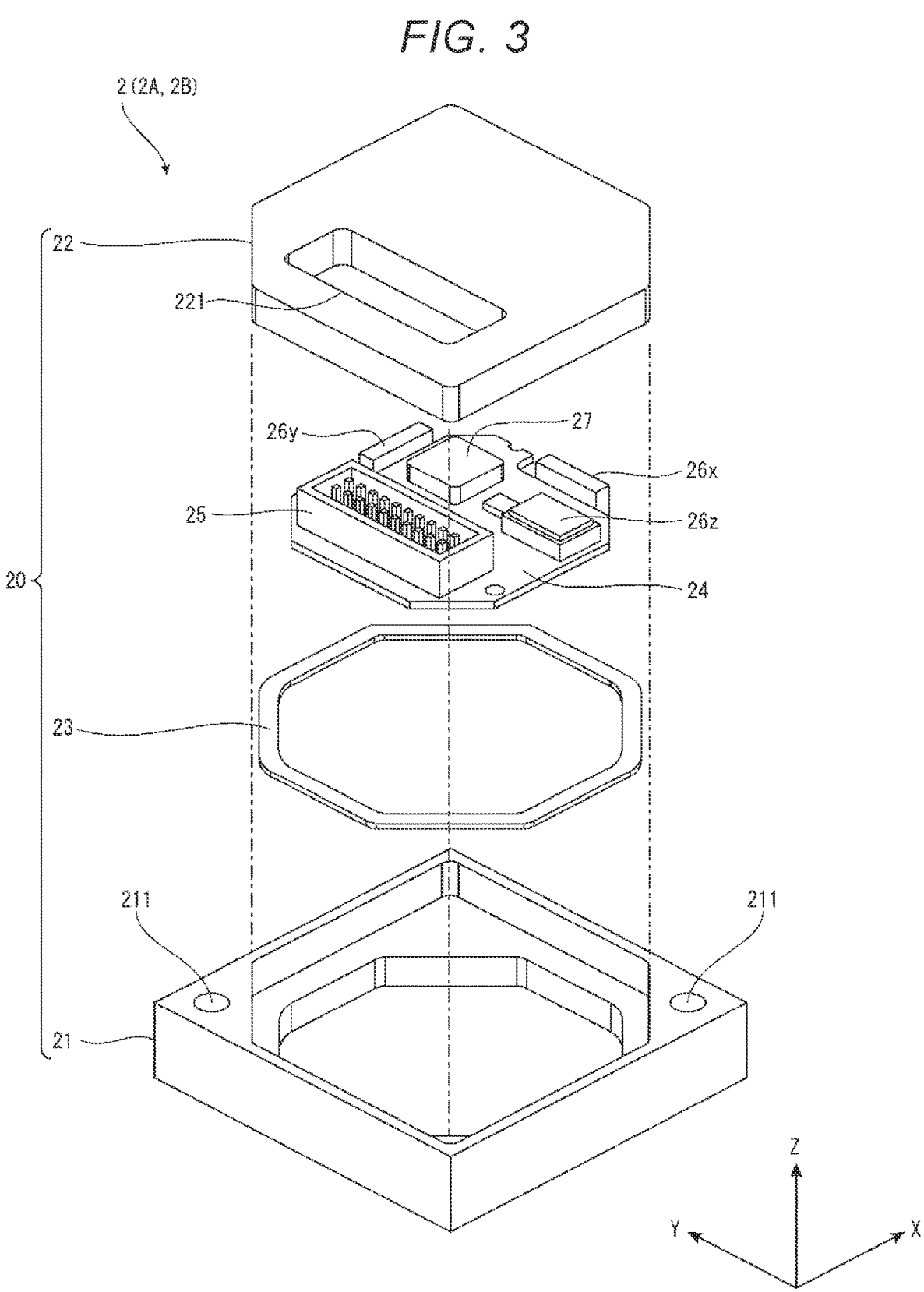
FIG. 3 is an exploded perspective view showing a sensor module.
Figure 4:
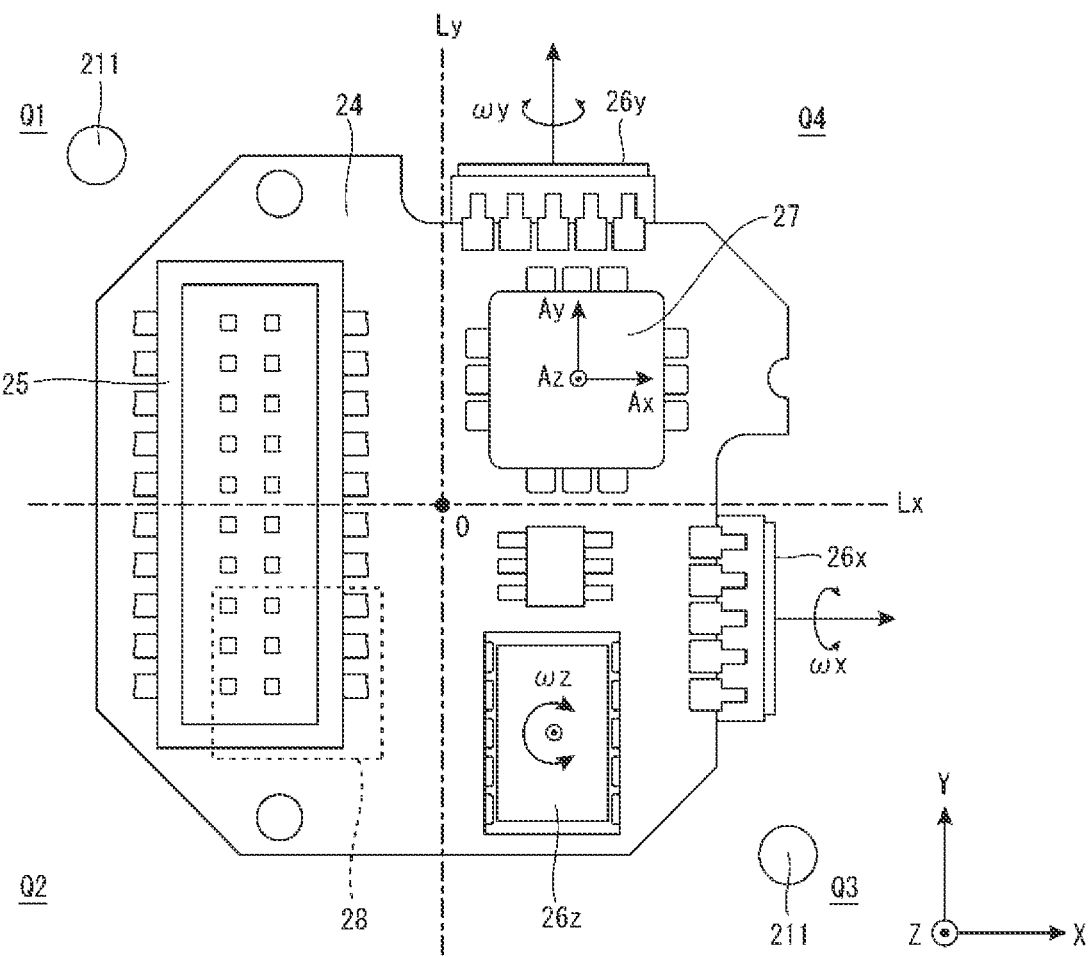
FIG. 4 is a top view showing a circuit board provided in the sensor module.
Figure 5:
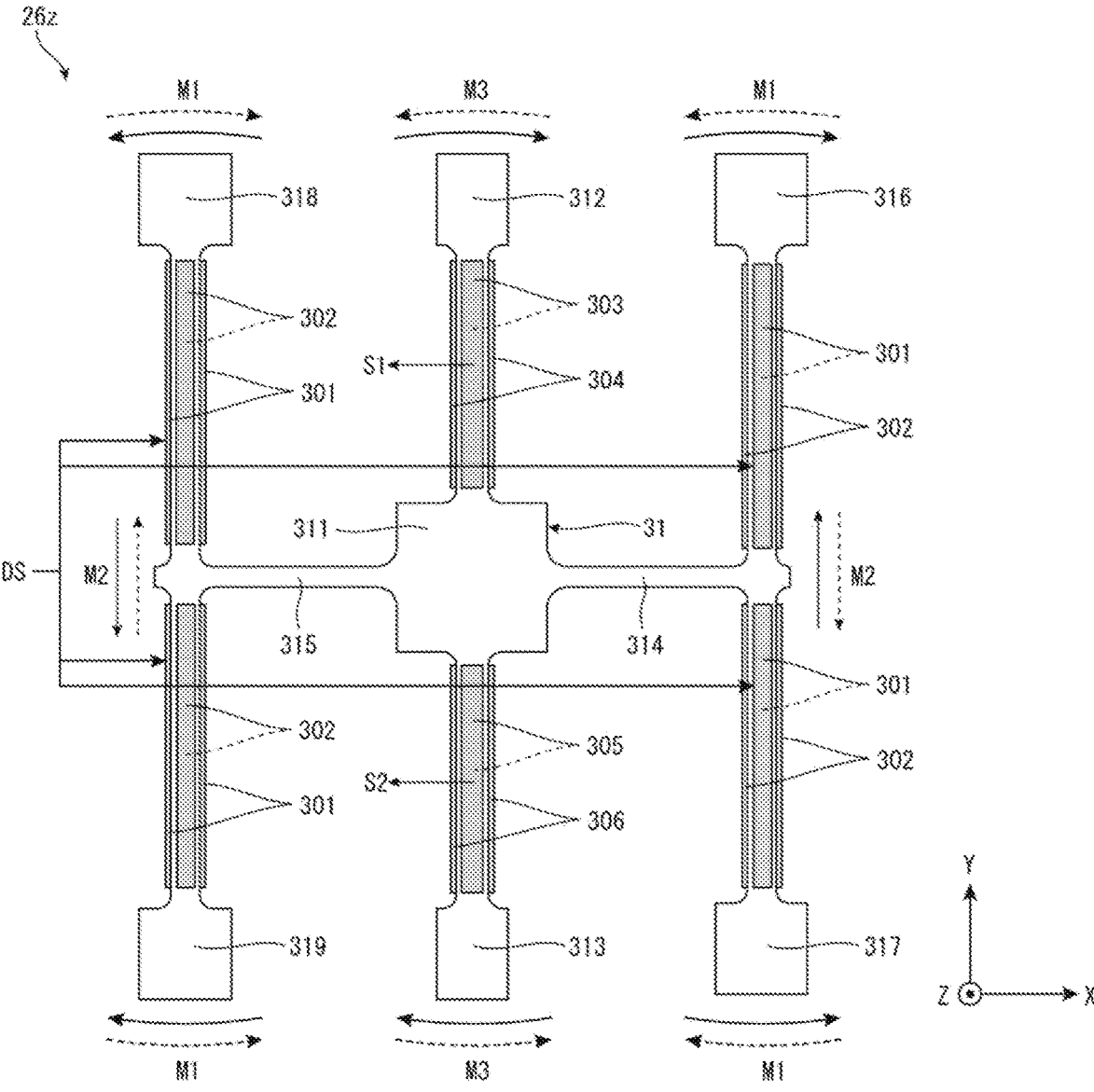
FIG. 5 is a plan view showing a vibrator provided in an angular velocity sensor.
Figure 6:
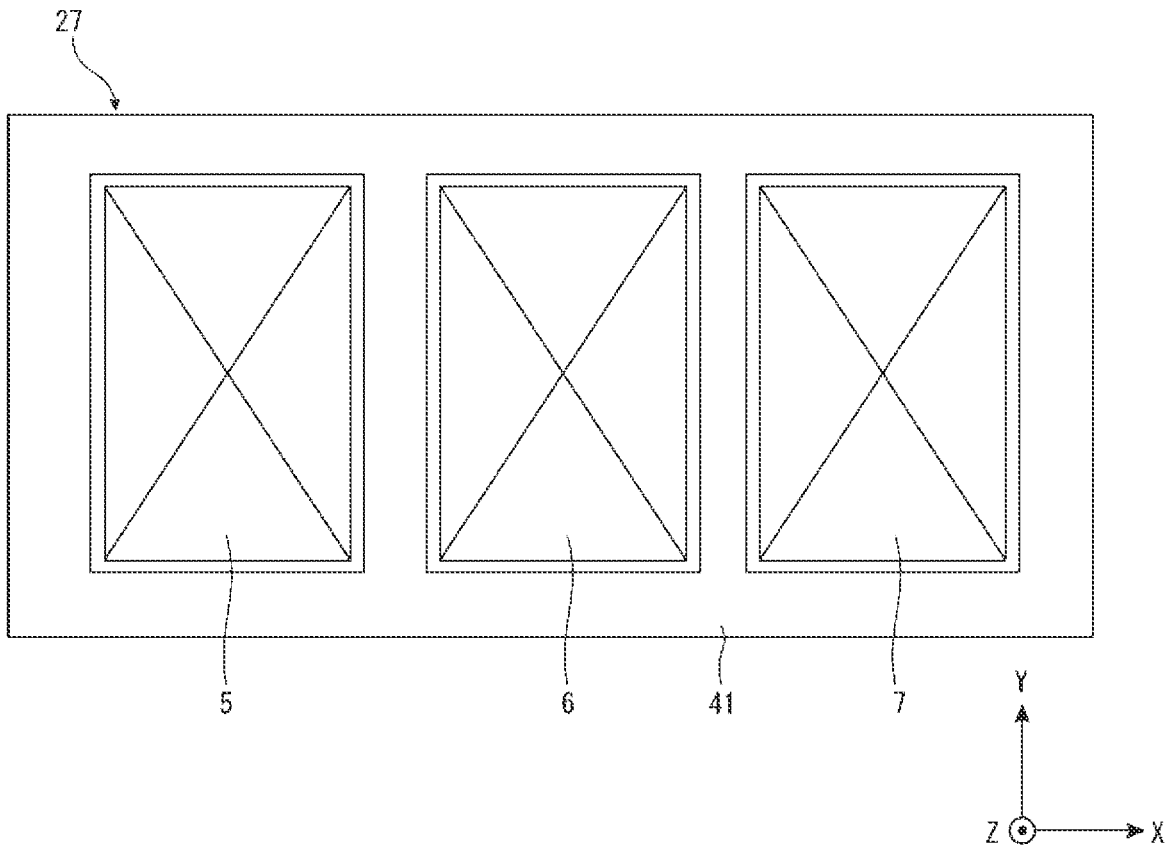
FIG. 6 is a plan view showing an acceleration sensor.
Figure 7:
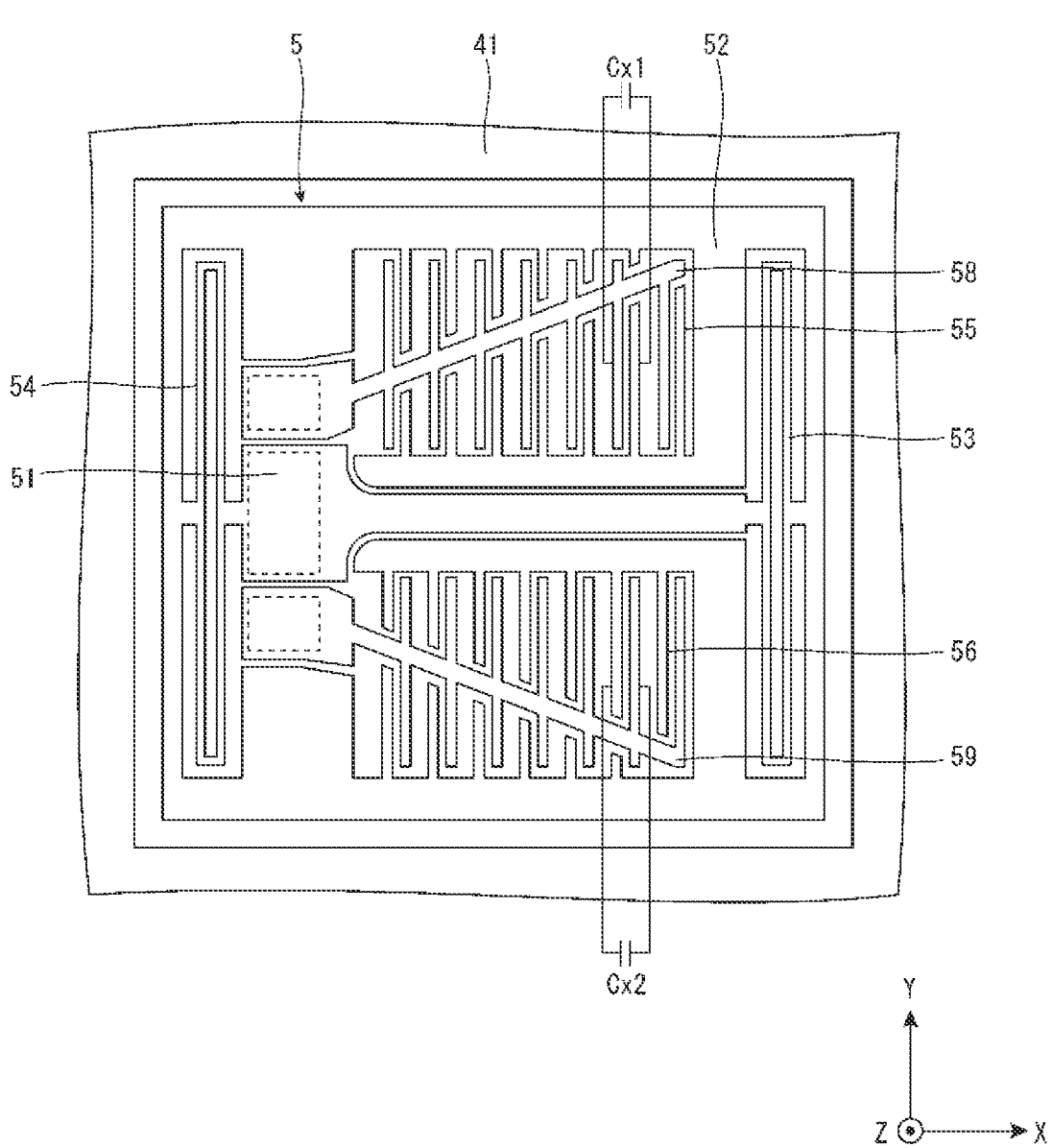
FIG. 7 is a plan view showing an X-axis acceleration sensor.
Figure 8:
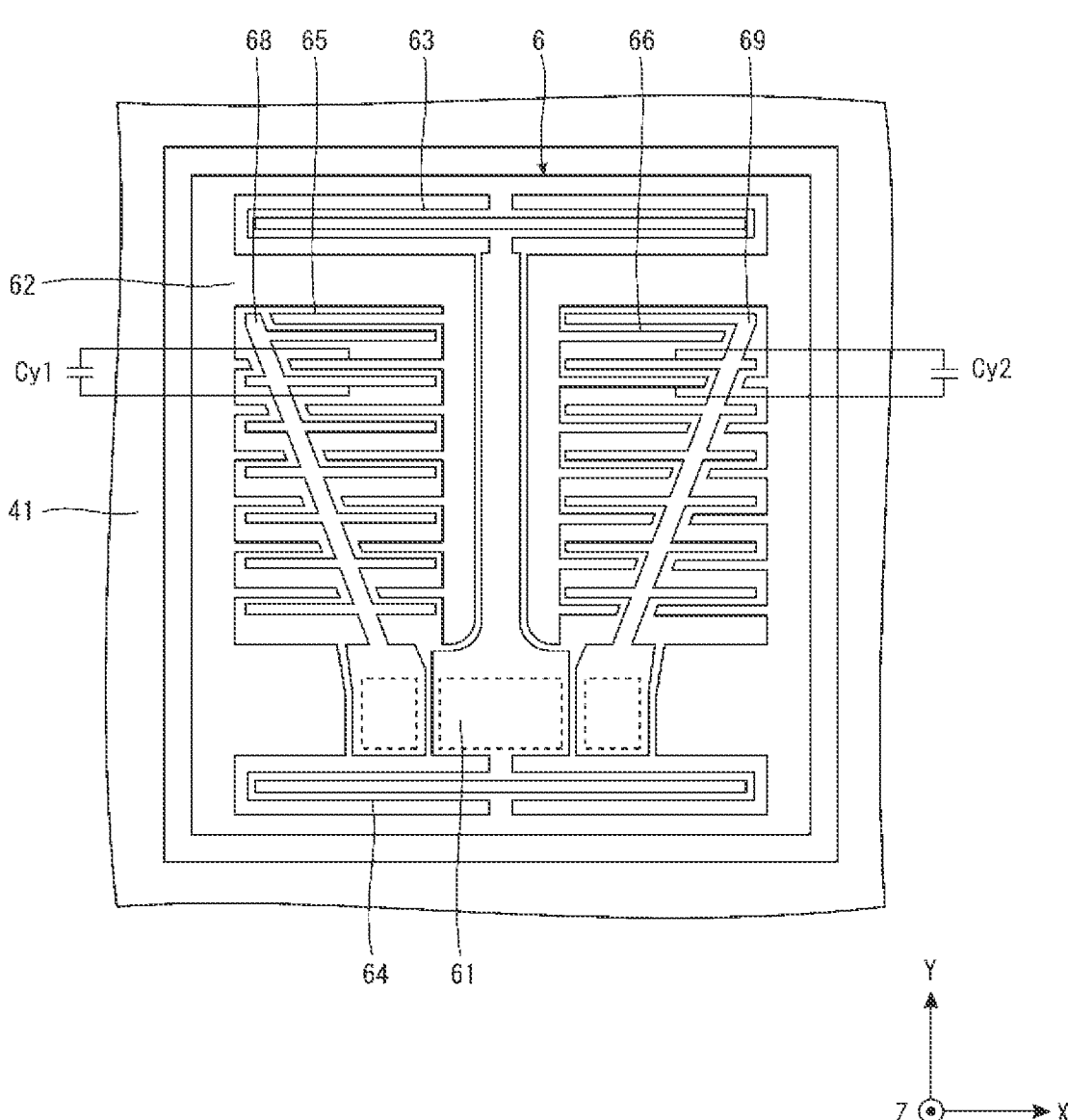
FIG. 8 is a plan view showing a Y-axis acceleration sensor.
Figure 9:
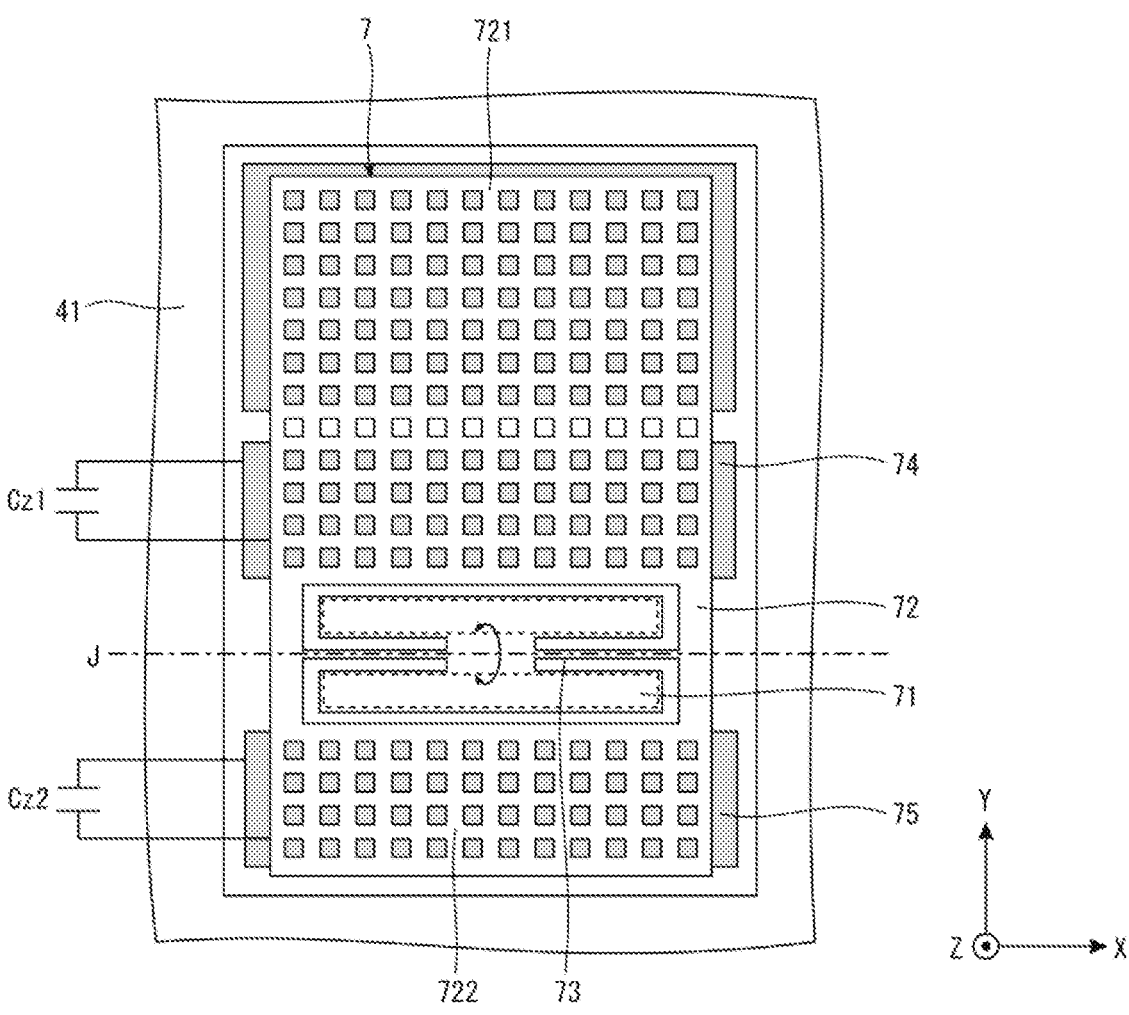
FIG. 9 is a plan view showing a Z-axis acceleration sensor.
Figure 10:
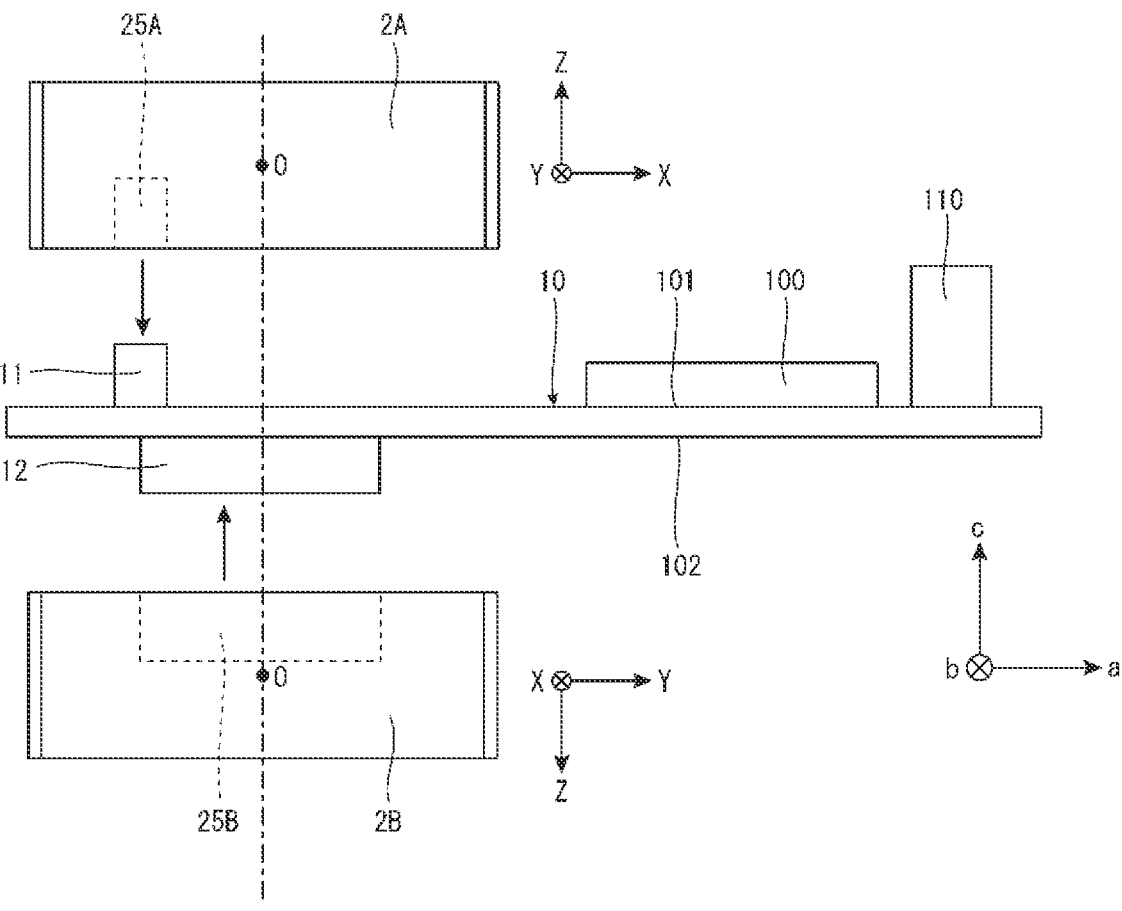
FIG. 10 is a side view showing the substrate provided in the sensor unit.
Figure 11:
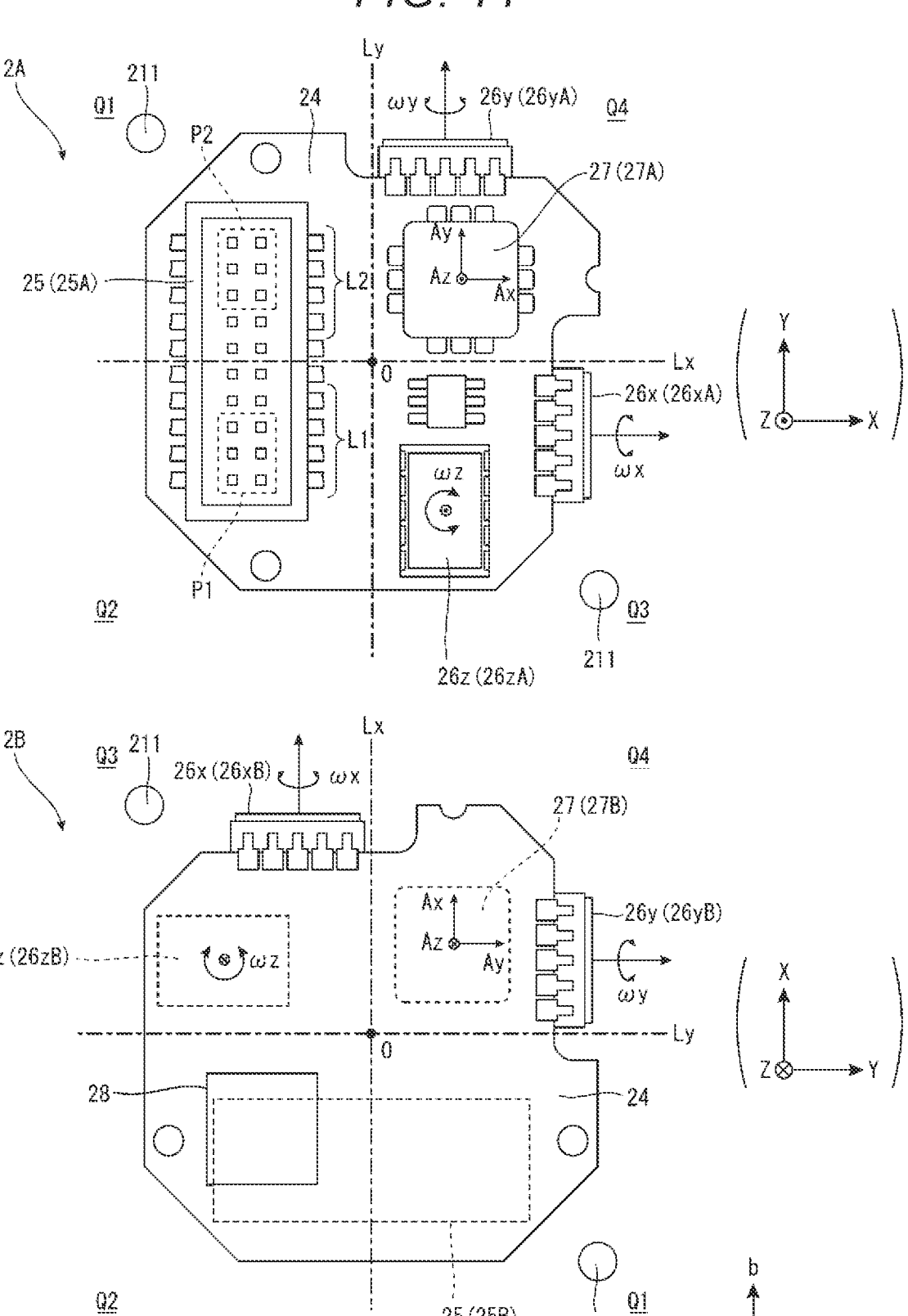
FIG. 11 is a plan view showing a positional relationship between a first sensor module and a second sensor module.

FIG. 1 is a plan view showing a sensor unit according to a first embodiment. FIG. 2 is a side view showing a substrate provided in the sensor unit. FIG. 3 is an exploded perspective view showing a sensor module. FIG. 4 is a top view showing a circuit board provided in the sensor module. FIG. 5 is a plan view showing a vibrator provided in an angular velocity sensor. FIG. 6 is a plan view showing an acceleration sensor. FIG. 7 is a plan view showing an X-axis acceleration sensor. FIG. 8 is a plan view showing a Y-axis acceleration sensor. FIG. 9 is a plan view showing a Z-axis acceleration sensor. FIG. 10 is a side view showing the substrate provided in the sensor unit. FIG. 11 is a plan view showing a positional relationship between a first sensor module and a second sensor module.

In the following description, an a axis, a b axis, and a c axis, which are three axes orthogonal to one another, are set in the sensor unit for convenience of description. A direction along the a axis is also referred to as an a-axis direction, a direction along the b axis is also referred to as a b-axis direction, and a direction along the c axis is also referred to as a c-axis direction. An arrow side of each axis is also referred to as a "plus side", and an opposite side is also referred to as a "minus side". A plus side in the c-axis direction is also referred to as "upper", and a minus side in the c-axis direction is also referred to as "lower". A plan view from the c-axis direction is also simply referred to as a "plan view".

A sensor unit 1 shown in FIG. 1 is, for example, an inertial measurement device that detects a posture or behavior of a moving body such as an automobile, an agricultural machine, a construction machine, a robot, or a drone. The sensor unit 1 is a composite sensor unit including an angular velocity sensor that detects angular velocities in three axes and an acceleration sensor that detects accelerations in three axes. Accordingly, the sensor unit 1 is highly convenient. As shown in FIG. 1, the sensor unit 1 includes a substrate 10, a first sensor module 2A and a second sensor module 2B mounted on the substrate 10, and a container 9 that accommodates these above.

First, the container 9 will be described. The container 9 includes a base 91 having a recess 911 opened on an upper surface of the container 9, and a lid 92 fixed to the base 91 so as to close an opening of the recess 911. An accommodating space S is formed inside the container 9, and the first and second sensor modules 2A, 2B are accommodated in the accommodating space S while being mounted on the substrate 10. This makes it possible to protect the first and second sensor modules 2A, 2B and the substrate 10 from dust, dirt, moisture, ultraviolet light, impact, and the like.

A connector 93 is attached to a side wall of the base 91. The connector 93 has a function of electrically coupling the inside and the outside of the container 9, and includes a substrate 931 including an interface circuit. The interface circuit has an interface function between the sensor unit 1 and another sensor or circuit module.

Next, the substrate 10 will be described. As shown in FIG. 2, the substrate 10 has an elongated shape extending in the a-axis direction, and is a circuit substrate on which a predetermined circuit or wiring is formed. The substrate 10 is fixed to the base 91 by, for example, screwing. The substrate 10 has an upper surface 101 as a first surface and a lower surface 102 as a second surface, which are in a front and back relationship. A connector 11 as a first coupling portion is disposed at an end portion of the upper surface 101 on a minus side in the a-axis direction, and a control device 100 and a connector 110 are disposed at an end portion of the upper surface 101 on a plus side in the a-axis direction. A connector 12 serving as a second coupling portion is disposed at an end portion of the lower surface 102 on the minus side in the a-axis direction. Each of the connectors 11, 12, 110 is electrically coupled to the control device 100 via a wiring (not shown) formed on the substrate 10.

The control device 100 controls driving of each part of the sensor unit 1, in particular, the first sensor module 2A and the second sensor module 2B. The control device 100 includes a control circuit. The control circuit is, for example, a micro controller unit (MCU), includes therein an A/D converter, a storage unit including a nonvolatile memory, and the like, and controls each part of the sensor unit 1. The connector 110 is electrically coupled to the interface circuit of the substrate 931 via a wiring (not shown). Accordingly, the control device 100 and the substrate 931 are electrically coupled to each other.

Next, the first and second sensor modules 2A, 2B will be described. The first and second sensor modules 2A, 2B will be collectively referred to as a "sensor module 2" in the following description since they have the same configuration. The present disclosure is not limited thereto, and the first and second sensor modules 2A, 2B may have configurations different from each other.

In the description of the sensor module 2, three axes orthogonal to one another are defined as an X axis, a Y axis, and a Z axis. A direction along the X axis is also referred to as an X-axis direction, a direction along the Y axis is also referred to as a Y-axis direction, and a direction along the Z axis is also referred to as a Z-axis direction. An arrow side of each axis is also referred to as a "plus side", and an opposite side is also referred to as a "minus side". The X axis, the Y axis, and the Z axis are axes set for the sensor module 2, and are axes different from the a axis, the b axis, and the c axis, which are axes set for the sensor unit 1.

As shown in FIG. 3, the sensor module 2 includes a case 20. The case 20 includes an outer case 21 and an inner case 22, and has a configuration in which the inner case 22 is inserted into the outer case 21, and the inner case 22 and the outer case 21 are joined by a joining member 23. The case 20 has a substantially rectangular shape, particularly a square shape, in a plan view from the Z-axis direction. Screw holes 211 through which screws are inserted are provided in a pair of corner portions of the outer case 21, which are located diagonally. The sensor module 2 is screwed to the substrate 10 by screws (not shown) inserted into the screw holes 211. An outer shape of the sensor module 2 is not particularly limited. A method for fixing the sensor module 2 to the substrate 10 is not particularly limited.

The sensor module 2 includes a circuit board 24 accommodated between the outer case 21 and the inner case 22. The circuit board 24 is supported by the inner case 22. As shown in FIG. 4, the circuit board 24 is attached with a connector 25 as a coupled portion for electrical coupling with the outside, an angular velocity sensor 26x that detects an angular velocity ωx about the X axis, an angular velocity sensor 26y that detects an angular velocity ωy about the Y axis, an angular velocity sensor 26z that detects an angular velocity ωz about the Z axis, an acceleration sensor 27 that detects an acceleration in each axial direction of the X axis, the Y axis, and the Z axis, and a control IC 28. The angular velocity sensor 26x, the angular velocity sensor 26y, the angular velocity sensor 26z, and the acceleration sensor 27 are electrically coupled to the control IC 28, and the control IC 28 is electrically coupled to the connector 25. The connector 25 is exposed from an opening 221 formed in the inner case 22, and is coupled to the connectors 11, 12 of the substrate 10.

In this way, the angular velocity sensor 26x, the angular velocity sensor 26y, the angular velocity sensor 26z, and the acceleration sensor 27 are accommodated in the case 20, whereby these sensors can be protected.

Hereinafter, as shown in FIG. 4, in a plan view from the Z-axis direction, four quadrants defined by a first virtual line Lx intersecting with a center O of the sensor module 2 and extending in the X-axis direction and a second virtual line Ly intersecting with the center O and extending in the Y-axis direction are referred to as a first quadrant Q1, a second quadrant Q2, a third quadrant Q3, and a fourth quadrant Q4. The first quadrant Q1 is located on a minus side in the X-axis direction and a plus side in the Y-axis direction with respect to the center O. The second quadrant Q2 is located on the minus side in the X-axis direction and a minus side in the Y-axis direction with respect to the center O. The third quadrant Q3 is located on a plus side in the X-axis direction and the minus side in the Y-axis direction with respect to the center O. The fourth quadrant Q4 is located on the plus side in the X-axis direction and the plus side in the Y-axis direction with respect to the center O.

The connector 25 is disposed on an upper surface of the circuit board 24 and is located across the first quadrant Q1 and the second quadrant Q2. The angular velocity sensor 26x is disposed on a side surface of the circuit board 24 and is located in the third quadrant Q3. The angular velocity sensor 26y is disposed on a side surface of the circuit board 24 and is located in the fourth quadrant Q4. The angular velocity sensor 26z is disposed on the upper surface of the circuit board 24 and is located in the third quadrant Q3. The acceleration sensor 27 is disposed on the upper surface of the circuit board 24 and is located in the fourth quadrant Q4. The control IC 28 is disposed on a lower surface of the circuit board 24 and is located in the second quadrant Q2.

The control IC 28 is, for example, a micro controller unit (MCU), and controls each part of the sensor module 2. A storage unit (not shown) in the control IC 28 stores a program defining an order and contents for detecting an acceleration and an angular velocity, a program for digitizing detection data and incorporating the digitized detection data into packet data, accompanying data, and the like. In addition, a plurality of electronic components are mounted on the circuit board 24.

As shown in FIG. 5, the angular velocity sensor 26z includes a vibrator 31. The vibrator 31 is a quartz crystal vibrator, and includes a base portion 311 located at a central portion, a pair of detection arms 312, 313 extending from the base portion 311 to both sides in the Y-axis direction, a pair of coupling arms 314, 315 extending from the base portion 311 to both sides in the X-axis direction, a pair of drive arms 316, 317 extending from a distal end portion of the coupling arm 314 to both sides in the Y-axis direction, and a pair of drive arms 318, 319 extending from a distal end portion of the coupling arm 315 to both sides in the Y-axis direction.

Drive signal electrodes 301 are disposed on upper and lower surfaces of the drive arms 316, 317 and on both side surfaces of the drive arms 318, 319, and drive ground electrodes 302 are disposed on both side surfaces of the drive arms 316, 317 and on upper and lower surfaces of the drive arms 318, 319. Then, a drive signal DS is supplied to the drive signal electrode 301. First detection signal electrodes 303 are disposed on upper and lower surfaces of the detection arm 312, and first detection ground electrodes 304 are disposed on both side surfaces of the detection arm 312. Second detection signal electrodes 305 are disposed on upper and lower surfaces of the detection arm 313, and second detection ground electrodes 306 are disposed on both side surfaces of the detection arm 313. Then, detection signals S1, S2 are output from the first and second detection signal electrodes 303, 305.

When the drive signal DS is applied to the vibrator 31, the drive arms 316, 317, 318, 319 bend and vibrate as indicated by an arrow M1 due to an inverse piezoelectric effect. Hereinafter, this drive mode is referred to as a drive vibration mode. At this time, since the drive arms 316, 317 and the drive arms 318, 319 vibrate in opposite phases, these vibrations are cancelled and the detection arms 312, 313 do not substantially vibrate. When the angular velocity $\omega z$ is applied to the vibrator 31 in a state in which the vibrator 31 is driven in the drive vibration mode, a detection vibration mode is newly excited. In the detection vibration mode, Coriolis force acts on the drive arms 316, 317, 318, 319 to excite vibration in a direction indicated by an arrow M2, and the detection arms 312, 313 bend and vibrate in a direction indicated by an arrow M3 in response to the vibration. Charge signals generated in the detection arms 312, 313 in such a detection vibration mode are output as the detection signals S1, S2, and the angular velocity $\omega z$ about the Z axis is detected based on the detection signals S1, S2.

The angular velocity sensor 26z has been described above. A configuration of the angular velocity sensor 26z is not particularly limited as long as the angular velocity $\omega z$ can be detected. For example, a vibrator of a tuning fork type or an H type may be used as the vibrator 31. The vibrator 31 may be implemented by a MEMS silicon vibrator instead of a quartz crystal vibrator.

The angular velocity sensor 26x has the same configuration as that of the angular velocity sensor 26z described above, and is mounted on the circuit board 24 in a state in which the angular velocity sensor 26x is rotated about the Y axis by 90° with respect to the angular velocity sensor 26z. Accordingly, a detection axis of the angular velocity sensor 26x is along the X axis, and the angular velocity sensor 26x can detect the angular velocity $\omega x$ about the X axis. Similarly, the angular velocity sensor 26y has the same configuration as the angular velocity sensor 26z described above, and is mounted on the circuit board 24 in a state in which the angular velocity sensor 26y is rotated about the X axis by 90° with respect to the angular velocity sensor 26z. Accordingly, a detection axis of the angular velocity sensor 26y is along the Y axis, and the angular velocity sensor 26y can detect the angular velocity $\omega y$ about the Y axis.

The angular velocity sensors 26x, 26y, 26z have been described above. Here, in order to prevent mutual interference, the angular velocity sensors 26x, 26y, 26z are used at different frequencies of the vibrator 31 (a resonance frequency of the drive vibration mode and a resonance frequency of the detection vibration mode). Accordingly, it is difficult for the angular velocity sensors 26y, 26z to detect vibration (hereinafter, also referred to as "leakage vibration") of the vibrator 31 leaking from the angular velocity sensor 26x, it is difficult for the angular velocity sensors 26x, 26z to detect leakage vibration from the angular velocity sensor 26y, and it is difficult for the angular velocity sensors 26x, 26y to detect leakage vibration from the angular velocity sensor 26z. Therefore, noise is less likely to occur in the angular velocity sensors 26x, 26y, 26z, and the angular velocities $\omega x$, $\omega y$, $\omega z$ can be accurately detected.

As shown in FIG. 6, the acceleration sensor 27 includes an X-axis acceleration sensor 5, a Y-axis acceleration sensor 6, and a Z-axis acceleration sensor 7, which are disposed on a substrate 41. The acceleration sensors 5, 6, 7 are collectively formed by, for example, bonding a silicon substrate doped with impurities such as phosphorus (P), boron (B), and arsenic (As) to an upper surface of the substrate 41 and then patterning the silicon substrate by a deep trench etching technique.

The X-axis acceleration sensor 5 detects an acceleration Ax in the X-axis direction. As shown in FIG. 7, the X-axis acceleration sensor 5 includes a fixed portion 51 fixed to the substrate 41, a movable body 52 displaceable in the X-axis direction with respect to the fixed portion 51, springs 53, 54 coupling the fixed portion 51 and the movable body 52, a first movable electrode 55 and a second movable electrode 56 each having a comb shape provided in the movable body 52, a first fixed electrode 58 having a comb shape fixed to the substrate 41 and engaged with the first movable electrode 55, and a second fixed electrode 59 having a comb shape fixed to the substrate 41 and engaged with the second movable electrode 56.

When the acceleration sensor 27 is driven, a drive voltage is applied to the movable body 52, whereby a capacitance Cx1 is formed between the first movable electrode 55 and the first fixed electrode 58, and a capacitance Cx2 is formed between the second movable electrode 56 and the second fixed electrode 59. Then, when the acceleration Ax is applied to the X-axis acceleration sensor 5, the movable body 52 is displaced in the X-axis direction, and accordingly, the capacitances Cx1, Cx2 change in opposite phases. Therefore, the acceleration Ax can be obtained based on changes in the capacitances Cx1, Cx2.

The Y-axis acceleration sensor 6 detects an acceleration Ay in the Y-axis direction. For example, as shown in FIG. 8, the Y-axis acceleration sensor 6 may have a configuration in which the above-described X-axis acceleration sensor 5 is rotated about the Z axis by 90°. That is, the Y-axis acceleration sensor 6 includes a fixed portion 61 fixed to the substrate 41, a movable body 62 displaceable in the Y-axis direction with respect to the fixed portion 61, springs 63, 64 coupling the fixed portion 61 and the movable body 62, a first movable electrode 65 and a second movable electrode 66 each having a comb shape provided in the movable body 62, a first fixed electrode 68 having a comb shape fixed to the substrate 41 and engaged with the first movable electrode 65, and a second fixed electrode 69 having a comb shape fixed to the substrate 41 and engaged with the second movable electrode 66.

When the acceleration sensor 27 is driven, a drive voltage is applied to the movable body 62, whereby a capacitance Cy1 is formed between the first movable electrode 65 and the first fixed electrode 68, and a capacitance Cy2 is formed between the second movable electrode 66 and the second fixed electrode 69. Then, when the acceleration Ay is applied to the Y-axis acceleration sensor 6, the movable body 62 is displaced in the Y-axis direction, and accordingly, the capacitances Cy1, Cy2 change in opposite phases. Therefore, the acceleration Ay can be obtained based on changes in the capacitances Cy1, Cy2.

The Z-axis acceleration sensor 7 detects an acceleration Az in the Z-axis direction. For example, as shown in FIG. 9, the Z-axis acceleration sensor 7 includes a fixed portion 71 fixed to the substrate 41, and a movable body 72 coupled to the fixed portion 71 via a beam 73 and swingable about a swing axis J along the X axis with respect to the fixed portion 71. The movable body 72 includes a first movable portion 721 located on one side of the swing axis J and a second movable portion 722 located on the other side of the swing axis J and having a rotational moment about the swing axis J smaller than that of the first movable portion 721. A first fixed electrode 74 facing the first movable portion 721 and a second fixed electrode 75 facing the second movable portion 722 are disposed on the substrate 41.

When the acceleration sensor 27 is driven, a drive voltage is applied to the movable body 72, whereby a capacitance Cz1 is formed between the first movable portion 721 and the first fixed electrode 74, and a capacitance Cz2 is formed between the second movable portion 722 and the second fixed electrode 75. Then, when the acceleration Az is applied to the Z-axis acceleration sensor 7, the movable body 72 is displaced about the swing axis J, and accordingly, the capacitances Cz1, Cz2 change in opposite phases. Therefore, the acceleration Az can be obtained based on changes in the capacitances Cz1, Cz2.

The acceleration sensor 27 has been described above. A configuration of the acceleration sensor 27 is not particularly limited as long as the acceleration Ax, Ay, Az can be detected. For example, in the embodiment, a MEMS silicon element is used as the X-axis acceleration sensor 5, the Y-axis acceleration sensor 6, and the Z-axis acceleration sensor 7, but the present disclosure is not limited thereto, and for example, a quartz crystal vibrator may be used. The X-axis acceleration sensor 5, the Y-axis acceleration sensor 6, and the Z-axis acceleration sensor 7 may be formed separately.

As described above, the first sensor module 2A and second sensor module 2B are collectively referred to as the "sensor module 2". Next, arrangement of the first and second sensor modules 2A, 2B will be described. Hereinafter, for convenience of description, the connector 25, the angular velocity sensor 26x, the angular velocity sensor 26y, the angular velocity sensor 26z, and the acceleration sensor 27 provided in the first sensor module 2A are also referred to as a first connector 25A, a first angular velocity sensor 26xA, a first angular velocity sensor 26yA, a first angular velocity sensor 26zA, and a first acceleration sensor 27A, respectively, and the connector 25, the angular velocity sensor 26x, the angular velocity sensor 26y, the angular velocity sensor 26z, and the acceleration sensor 27 provided in the second sensor module 2B are also referred to as a second connector 25B, a second angular velocity sensor 26xB, a second angular velocity sensor 26yB, a second angular velocity sensor 26zB, and a second acceleration sensor 27B, respectively.

As shown in FIG. 10, the first sensor module 2A is located on a side close to the upper surface 101 of the substrate 10, and is disposed in a posture in which the first connector 25A as a first coupled portion faces the upper surface 101. The first sensor module 2A is screwed to the substrate 10 in a state in which the first connector 25A is coupled to the connector 11 on the upper surface 101. On the other hand, the second sensor module 2B is located on a side close to the lower surface 102 of the substrate 10, and is disposed in a posture in which the second connector 25B as a second coupled portion faces the lower surface 102. The second sensor module 2B is screwed to the substrate 10 in a state in which the second connector 25B is coupled to the connector 12 on the lower surface 102.

In this way, in the sensor unit 1, the first sensor module 2A and the control device 100 are electrically coupled via the connector 11, and the second sensor module 2B and the control device 100 are electrically coupled via the connector 12. Therefore, a wiring length between the first and second sensor modules 2A, 2B and the control device 100 can be shortened, and noise is less likely to occur. Therefore, the sensor unit 1 having excellent detection accuracy is obtained.

The first and second sensor modules 2A, 2B are disposed such that centers O overlap each other in a plan view. In the first sensor module 2A, a plus side in the X-axis direction is directed to a plus side in the a-axis direction, a plus side in the Y-axis direction is directed to a plus side in the b-axis direction, and a plus side in the Z-axis direction is directed to a plus side in the c-axis direction. On the other hand, in the second sensor module 2B, a plus side in the X-axis direction is directed to a plus side in the b-axis direction, a plus side in the Y-axis direction is directed to a plus side in the a-axis direction, and a plus side in the Z-axis direction is directed to a minus side in the c-axis direction. That is, the second sensor module 2B is disposed on the substrate 10 in a posture in which the second sensor module 2B is rotated about the Y axis by 1800 and further rotated about the Z axis by 90° with respect to the first sensor module 2A.

When the first and second sensor modules 2A, 2B are disposed in this way, as shown in FIG. 11, in a plan view, the first quadrant Q1 of the first sensor module 2A and the third quadrant Q3 of the second sensor module 2B overlap each other, the second quadrant Q2 of the first sensor module 2A and the second quadrant Q2 of the second sensor module 2B overlap each other, the third quadrant Q3 of the first sensor module 2A and the first quadrant Q1 of the second sensor module 2B overlap each other, and the fourth quadrant Q4 of the first sensor module 2A and the fourth quadrant Q4 of the second sensor module 2B overlap each other. Therefore, the first acceleration sensor 27A and the second acceleration sensor 27B overlap each other and can be disposed close to each other. Accordingly, it is possible to further reduce a difference among the accelerations Ax, Ay, Az received by the first acceleration sensor 27A and the second acceleration sensor 27B. Therefore, detection accuracy for the accelerations Ax, Ay, Az is improved.

The first angular velocity sensor 26xA and the second angular velocity sensor 26xB do not overlap each other, and are disposed in different quadrants. Therefore, the first angular velocity sensor 26xA and the second angular velocity sensor 26xB can be disposed apart from each other. Accordingly, leakage vibration of the first angular velocity sensor 26xA is less likely to be transmitted to the second angular velocity sensor 26xB, and leakage vibration of the second angular velocity sensor 26xB is less likely to be transmitted to the first angular velocity sensor 26xA. Therefore, unintended vibration due to an external force other than the angular velocity ωx of the first and second angular velocity sensors 26xA, 26xB can be prevented, and detection accuracy for the angular velocity ωx is improved. In particular, according to the embodiment, the first angular velocity sensor 26xA and the second angular velocity sensor 26xB are disposed separately in quadrants located diagonally, and thus can be disposed further apart from each other, and the above-described effect becomes more remarkable.

The first angular velocity sensor 26zA and the second angular velocity sensor 26zB do not overlap each other, and are disposed in different quadrants. Therefore, the first angular velocity sensor 26zA and the second angular velocity sensor 26zB can be disposed apart from each other. Accordingly, leakage vibration of the first angular velocity sensor 26zA is less likely to be transmitted to the second angular velocity sensor 26zB, and leakage vibration of the second angular velocity sensor 26zB is less likely to be transmitted to the first angular velocity sensor 26zA. Therefore, unintended vibration due to an external force other than the angular velocity ωz of the first and second angular velocity sensors 26zA, 26zB can be prevented, and detection accuracy for the angular velocity ωz is improved. In particular, according to the embodiment, the first angular velocity sensor 26zA and the second angular velocity sensor 26zB are disposed separately in quadrants located diagonally, and thus can be disposed further apart from each other, and the above-described effect becomes more remarkable.

On the other hand, the first angular velocity sensor 26yA and the second angular velocity sensor 26yB are located in the same quadrant, but do not overlap each other. Therefore, the first angular velocity sensor 26yA and the second angular velocity sensor 26yB can be disposed slightly apart from each other. Accordingly, leakage vibration of the first angular velocity sensor 26yA is less likely to be transmitted to the second angular velocity sensor 26yB, and leakage vibration of the second angular velocity sensor 26yB is less likely to be transmitted to the first angular velocity sensor 26yA. Therefore, unintended vibration due to an external force other than the angular velocity ωy of the first and second angular velocity sensors 26yA, 26yB can be prevented, and detection accuracy for the angular velocity ωy is improved.

In the embodiment, among a set of the first and second angular velocity sensors 26xA, 26xB, a set of the first and second angular velocity sensors 26yA, 26yB, and a set of the first and second angular velocity sensors 26zA, 26zB, the set of the first and second angular velocity sensors 26xA, 26xB and the set of the first and second angular velocity sensors 26zA, 26zB have relationships of being located in different quadrants, but the present disclosure is not limited thereto, and at least one of the above three sets may have the above-described positional relationship. A mutual positional relationship in a set not having this relationship is not particularly limited, and for example, as in a set of first and second angular velocity sensors 26zA, 26zB according to a second embodiment to be described later, the angular velocity sensors 26zA, 26zB may be located in the same quadrant and overlap each other.

The first connector 25A and the second connector 25B partially overlap each other. Specifically, an end portion of the first connector 25A on a minus side in the Y-axis direction and an end portion of the second connector 25B on a minus side in the Y-axis direction overlap each other. Therefore, in the embodiment, a pin P1 coupled to a common signal wiring L1 common to the first and second sensor modules 2A, 2B is disposed in the overlapping portion, and the common signal wiring L1 is intensively disposed in the second quadrant Q2. Examples of the common signal wiring L1 include a common power supply wiring, a common ground wiring, and a common access wiring of the first and second sensor modules 2A, 2B. A pin P2 coupled to individual signal wirings L2 of the first and second sensor modules 2A, 2B is disposed in a non-overlapping portion, particularly in a portion located in the first quadrant Q1, and the individual signal wirings L2 are intensively disposed in the first quadrant Q1. Examples of the individual signal wiring L2 include a detection signal wiring.

Accordingly, the individual signal wiring L2 of the first sensor module 2A can be sufficiently spaced apart from the common signal wiring L1 of the second sensor module 2B, and capacitive coupling therebetween can be effectively prevented. Similarly, the individual signal wiring L2 of the second sensor module 2B can be sufficiently spaced apart from the common signal wiring L1 of the first sensor module 2A, and capacitive coupling therebetween can be effectively prevented. Therefore, noise is less likely to occur in detection signals from the first and second sensor modules 2A, 2B, and detection accuracy for the angular velocity and the acceleration is improved.

Although the first angular velocity sensor 26yA and the second angular velocity sensor 26xB are disposed side by side in the a-axis direction, since the angular velocity sensor 26x and the angular velocity sensor 26y are used at different frequencies as described above, interference therebetween can be prevented. Similarly, although the first angular velocity sensor 26xA and the second angular velocity sensor 26yB are disposed side by side in the b-axis direction, since the angular velocity sensor 26x and the angular velocity sensor 26y are used at different frequencies as described above, interference therebetween can be prevented.

According to arrangement of the embodiment, the screw holes 211 of the first sensor module 2A and the screw holes 211 of the second sensor module 2B overlap each other. Therefore, the first sensor module 2A and the second sensor module 2B can be fixed to the substrate 10, for example, by being fastened together.

The sensor unit 1 can detect an acceleration Aa in the a-axis direction, an acceleration Ab in the b-axis direction, an acceleration Ac in the c-axis direction, an angular velocity ωa about the a-axis, an angular velocity ωb about the b-axis, and an angular velocity ωc about the c-axis in the following way.

The acceleration Aa is obtained as an average value of the acceleration Ax applied to the first acceleration sensor 27A and the acceleration Ay applied to the second acceleration sensor 27B. The acceleration Ab is obtained as an average value of the acceleration Ay applied to the first acceleration sensor 27A and the acceleration Ax applied to the second acceleration sensor 27B. The acceleration Ac is obtained as an average value of the acceleration Az applied to the first acceleration sensor 27A and the acceleration Az applied to the second acceleration sensor 27B.

The angular velocity ωa is obtained as an average value of the angular velocity ox applied to the first angular velocity sensor 26xA and the angular velocity ωy applied to the second angular velocity sensor 26yB. The angular velocity ωb is obtained as an average value of the angular velocity ωy applied to the first angular velocity sensor 26yA and the angular velocity ox applied to the second angular velocity sensor 26xB. The angular velocity ωc is obtained as an average value of the angular velocity oz applied to the first angular velocity sensor 26zA and the angular velocity ωz applied to the second angular velocity sensor 26zB.

In this ωay, by obtaining the accelerations Aa, Ab, Ac and the angular velocities ωa, ωb, ωc as average values of detection signals of the two sensor modules 2, a noise density can be reduced to $1/\sqrt{2}$. Therefore, according to the sensor unit 1, it is possible to accurately detect the accelerations Aa, Ab, Ac and the angular velocities ωa, ωb, ωc. A unit of the noise density is G/√Hz in a case of the acceleration, and dps/√Hz in a case of the angular velocity.

The sensor unit 1 has been described above. As described above, the sensor unit 1 includes: the substrate 10 including the upper surface 101 as a first surface and the lower surface 102 as a second surface, which are in a front and back relationship, and including the connector 11 as a first coupling portion disposed on the upper surface 101 and the connector 12 as a second coupling portion disposed on the lower surface 102; the first sensor module 2A disposed on the upper surface 101 and including the first connector 25A as a first coupled portion that is located on a side close to the upper surface 101 and that is coupled to the connector 11, the first acceleration sensor 27A, the first angular velocity sensor 26xA, the first angular velocity sensor 26yA, and the first angular velocity sensor 26zA; and the second sensor module 2B disposed on the lower surface 102 and including the second connector 25B as a second coupled portion that is located on a side close to the lower surface 102 and that is coupled to the connector 12, the second acceleration sensor 27B, the second angular velocity sensor 26xB, the second angular velocity sensor 26yB, and the second angular velocity sensor 26zB. According to such a configuration, the first sensor module 2A and the control device 100 are electrically coupled via the connector 11, and the second sensor module 2B and the control device 100 are electrically coupled via the connector 12. Therefore, a wiring length between the first and second sensor modules 2A, 2B and the control device 100 can be shortened, and noise is less likely to occur. Therefore, the sensor unit 1 having excellent detection accuracy is obtained.

As described above, the first sensor module 2A includes the case 20 as a first case that accommodates the first acceleration sensor 27A, the first angular velocity sensor 26xA, the first angular velocity sensor 26yA, and the first angular velocity sensor 26zA, and the second sensor module 2B includes the case 20 as a second case that accommodates the second acceleration sensor 27B, the second angular velocity sensor 26xB, the second angular velocity sensor 26yB, and the second angular velocity sensor 26zB. Accordingly, each sensor can be protected.

As described above, the first sensor module 2A and the second sensor module 2B overlap each other in a plan view of the substrate 10, that is, in a plan view from the c-axis direction. When four quadrants are defined by the first virtual line Lx and the second virtual line Ly that intersect with the center O of the first sensor module 2A and are orthogonal to each other in the plan view from the c-axis direction, the first acceleration sensor 27A and the second acceleration sensor 27B are disposed in the same quadrant. Therefore, the first acceleration sensor 27A and the second acceleration sensor 27B can be disposed close to each other. Accordingly, it is possible to further reduce a difference in acceleration received by the first acceleration sensor 27A and the second acceleration sensor 27B. Therefore, detection accuracy for the acceleration is improved.

As described above, the first angular velocity sensor 26xA and the second angular velocity sensor 26xB are disposed in different quadrants. Accordingly, the first angular velocity sensor 26xA and the second angular velocity sensor 26xB can be disposed apart from each other. Therefore, leakage vibration of the first angular velocity sensor 26xA is less likely to be transmitted to the second angular velocity sensor 26xB, and leakage vibration of the second angular velocity sensor 26xB is less likely to be transmitted to the first angular velocity sensor 26xA. Therefore, unintended vibration due to an external force other than the angular velocity ωx of the first and second angular velocity sensors 26xA, 26xB can be prevented, and detection accuracy for the angular velocity ωx is improved.

As described above, the first angular velocity sensor 26xA is located in one of two quadrants located diagonally, and the second angular velocity sensor 26xB is located in the other quadrant. Accordingly, the first angular velocity sensor 26xA and the second angular velocity sensor 26xB can be disposed further apart from each other. Therefore, leakage vibration of the first angular velocity sensor 26xA is less likely to be transmitted to the second angular velocity sensor 26xB, and leakage vibration of the second angular velocity sensor 26xB is less likely to be transmitted to the first angular velocity sensor 26xA. Therefore, unintended vibration due to an external force other than the angular velocity ωx of the first and second angular velocity sensors 26xA, 26xB can be more effectively prevented, and detection accuracy for the angular velocity ωx is improved.

As described above, the first angular velocity sensor 26zA and the second angular velocity sensor 26zB are disposed in different quadrants. Accordingly, the first angular velocity sensor 26zA and the second angular velocity sensor 26zB can be disposed apart from each other. Therefore, leakage vibration of the first angular velocity sensor 26zA is less likely to be transmitted to the second angular velocity sensor 26zB, and leakage vibration of the second angular velocity sensor 26zB is less likely to be transmitted to the first angular velocity sensor 26zA. Therefore, unintended vibration due to an external force other than the angular velocity ωz of the first and second angular velocity sensors 26zA, 26zB can be prevented, and detection accuracy for the angular velocity ωz is improved.

As described above, the first angular velocity sensor 26zA is located in one of two quadrants located diagonally, and the second angular velocity sensor 26zB is located in the other quadrant. Accordingly, the first angular velocity sensor 26zA and the second angular velocity sensor 26zB can be disposed further apart from each other. Therefore, unintended vibration due to an external force other than the angular velocity ωz of the first and second angular velocity sensors 26zA, 26zB can be more effectively prevented, and detection accuracy for the angular velocity ωz is improved.

As described above, in the plan view in the c-axis direction, the first connector 25A and the second connector 25B overlap each other in one quadrant, and the first sensor module 2A and the second sensor module 2B include the common signal wiring L1 that is disposed in a quadrant where the first connector 25A and the second connector 25B overlap each other and that is common to the first sensor module 2A and the second sensor module 2B, and the individual signal wirings L2 that are disposed in a quadrant where the first connector 25A and the second connector 25B do not overlap and are individual to the first sensor module 2A and the second sensor module 2B. Accordingly, the individual signal wiring L2 of the first sensor module 2A can be sufficiently spaced apart from the common signal wiring L1 of the second sensor module 2B, and capacitive coupling therebetween can be effectively prevented. Similarly, the individual signal wiring L2 of the second sensor module 2B can be sufficiently spaced apart from the common signal wiring L1 of the first sensor module 2A, and capacitive coupling therebetween can be effectively prevented. Therefore, noise is less likely to occur in detection signals from the first and second sensor modules 2A, 2B, and detection accuracy for the angular velocity and the acceleration is improved.

Second Embodiment

Figure 12:
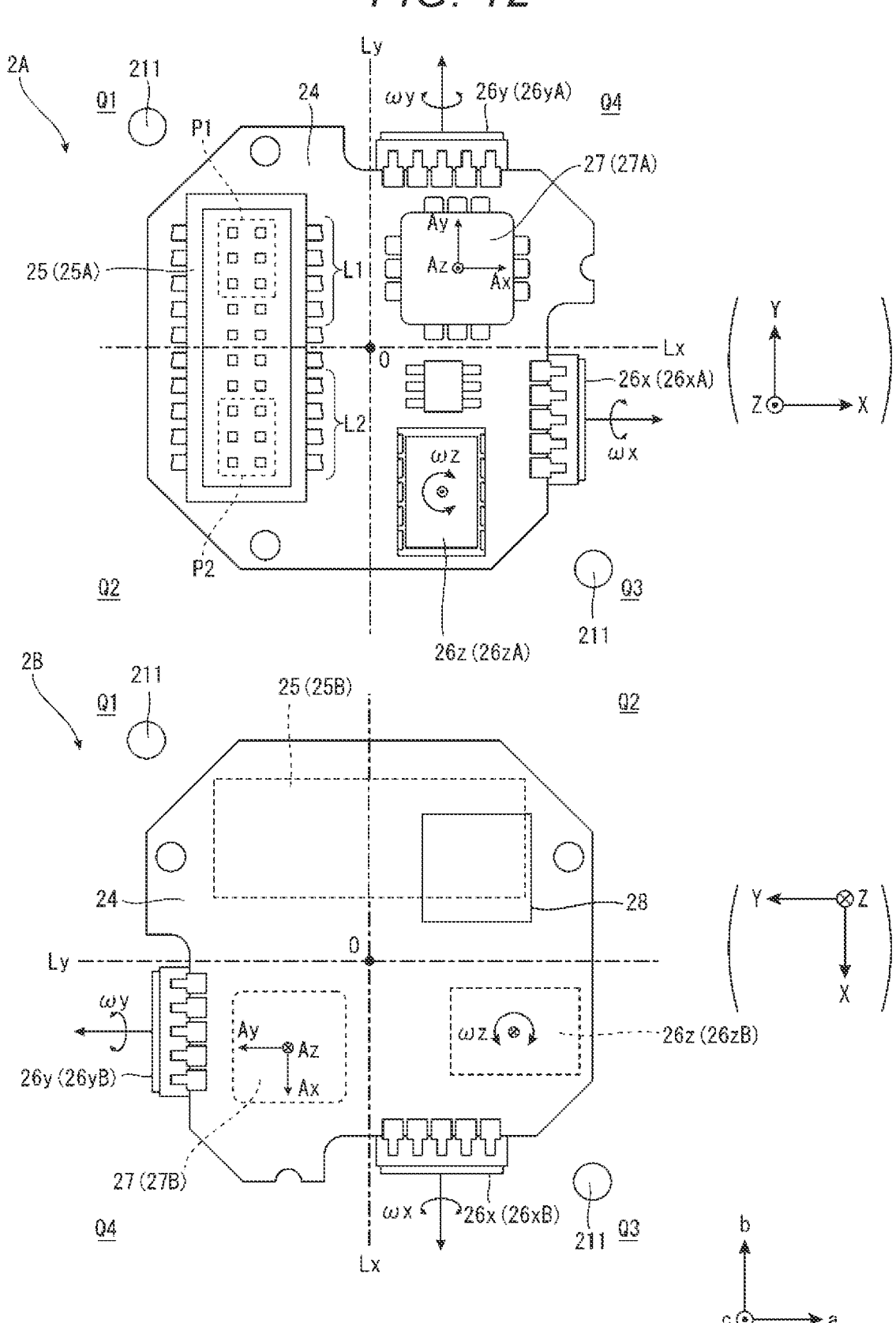
FIG. 12 is a plan view showing a positional relationship between a first sensor module and a second sensor module according to a second embodiment.

FIG. 12 is a plan view showing a positional relationship between a first sensor module and a second sensor module according to the second embodiment.

The sensor unit 1 according to the embodiment is the same as the sensor unit 1 according to the first embodiment described above except that arrangement of the first and second sensor modules 2A, 2B is different. In the following description, the sensor unit 1 according to the embodiment will be described focusing on differences from the first embodiment described above, and description of the same matters will be omitted. In the drawing of the embodiment, configurations similar to those of the above-described embodiment are denoted by the same reference numerals.

In the embodiment, the first and second sensor modules 2A, 2B are disposed such that the centers O overlap each other in a plan view from the c-axis direction. As shown in FIG. 12, in the first sensor module 2A, a plus side in the X-axis direction is directed to a plus side in the a-axis direction, a plus side in the Y-axis direction is directed to a plus side in the b-axis direction, and a plus side in the Z-axis direction is directed to a plus side in the c-axis direction. On the other hand, in the second sensor module 2B, a plus side in the X-axis direction is directed to a minus side in the b-axis direction, a plus side in the Y-axis direction is directed to a minus side in the a-axis direction, and a plus side in the Z-axis direction is directed to a minus side in the c-axis direction.

When the first and second sensor modules 2A, 2B are disposed in this way, the first quadrant Q1 of the first sensor module 2A and the first quadrant Q1 of the second sensor module 2B overlap each other, the second quadrant Q2 of the first sensor module 2A and the fourth quadrant Q4 of the second sensor module 2B overlap each other, the third quadrant Q3 of the first sensor module 2A and the third quadrant Q3 of the second sensor module 2B overlap each other, and the fourth quadrant Q4 of the first sensor module 2A and the second quadrant Q2 of the second sensor module 2B overlap each other in a plan view from the c-axis direction.

With this arrangement, the first angular velocity sensor 26yA and the second angular velocity sensor 26yB do not overlap each other, and are disposed in different quadrants. Therefore, the first angular velocity sensor 26yA and the second angular velocity sensor 26yB can be disposed apart from each other. Accordingly, leakage vibration of the first angular velocity sensor 26yA is less likely to be transmitted to the second angular velocity sensor 26yB, and leakage vibration of the second angular velocity sensor 26yB is less likely to be transmitted to the first angular velocity sensor 26yA. Therefore, unintended vibration due to an external force other than the angular velocity oy of the first and second angular velocity sensors 26yA, 26yB can be prevented, and detection accuracy for the angular velocity oy is improved. In particular, according to the embodiment, the first angular velocity sensor 26yA and the second angular velocity sensor 26yB are disposed separately in quadrants located diagonally, and thus can be disposed further apart from each other, and the above-described effect becomes more remarkable.

The first connector 25A and the second connector 25B partially overlap each other. Specifically, end portions on the plus side in the Y-axis direction overlap each other. Therefore, in the embodiment, the pin P1 coupled to the common signal wiring L1 common to the first and second sensor modules 2A, 2B is disposed in the overlapping portion, and the common signal wiring L1 is intensively disposed in the first quadrant Q1. The pin P2 coupled to the individual signal wirings L2 of the first and second sensor modules 2A, 2B are disposed in a non-overlapping portion, particularly in a portion located in the second quadrant Q2, and the individual signal wirings L2 are intensively disposed in the second quadrant Q2.

Accordingly, the individual signal wiring L2 of the first sensor module 2A can be sufficiently spaced apart from the common signal wiring L1 of the second sensor module 2B, and capacitive coupling therebetween can be effectively prevented. Similarly, the individual signal wiring L2 of the second sensor module 2B can be sufficiently spaced apart from the common signal wiring L1 of the first sensor module 2A, and capacitive coupling therebetween can be effectively prevented. Therefore, noise is less likely to occur in detection signals from the first and second sensor modules 2A, 2B, and detection accuracy for the angular velocity and the acceleration is improved.

According to the second embodiment, the same effects as those of the first embodiment described above can also be achieved.

Third Embodiment

Figure 13:
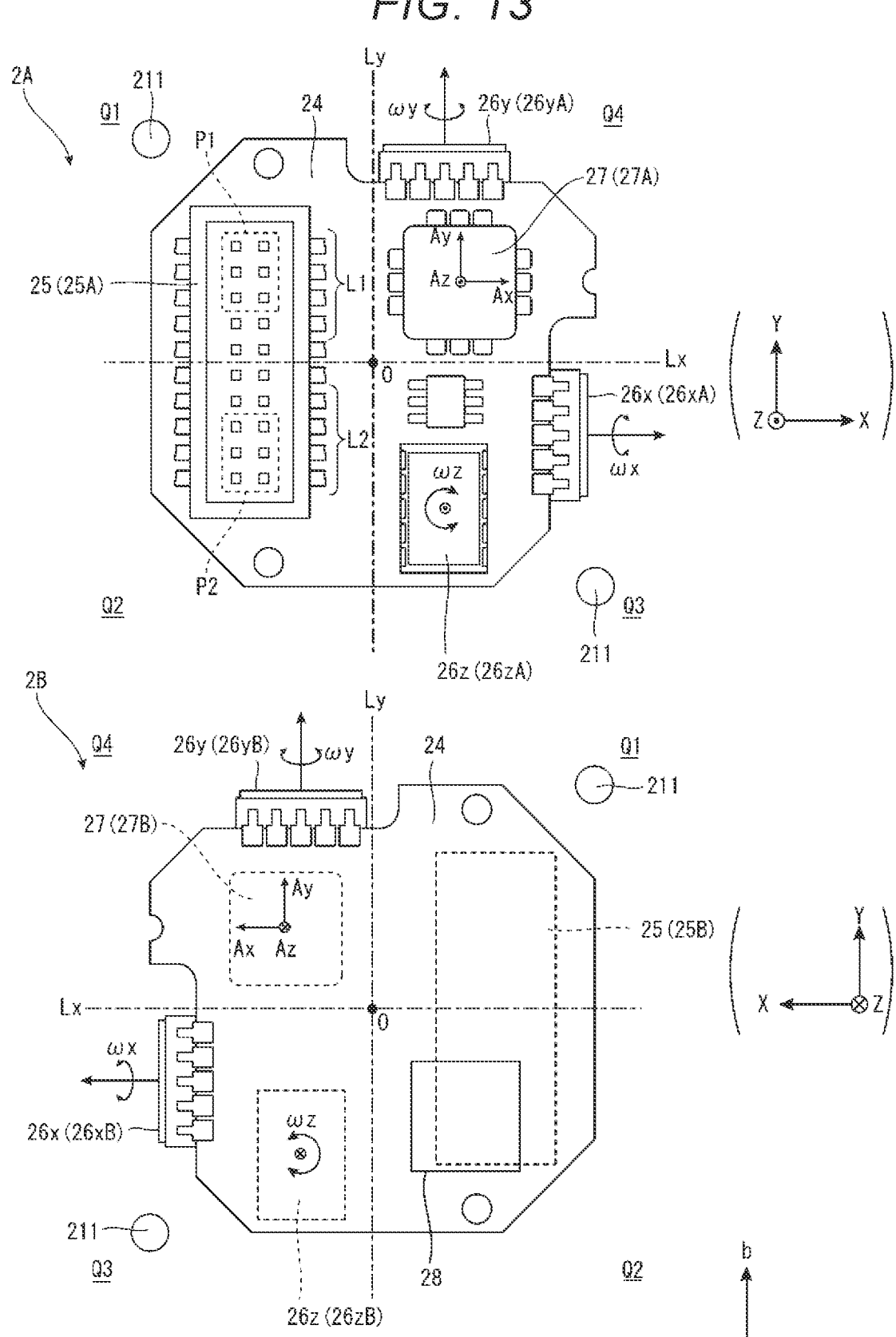
FIG. 13 is a plan view showing a positional relationship between a first sensor module and a second sensor module according to a third embodiment.

FIG. 13 is a plan view showing a positional relationship between a first sensor module and a second sensor module according to a third embodiment.

The sensor unit 1 according to the embodiment is the same as the sensor unit 1 according to the first embodiment described above except that arrangement of the first and second sensor modules 2A, 2B is different. In the following description, the sensor unit 1 according to the embodiment will be described focusing on differences from the first embodiment described above, and description of the same matters will be omitted. In the drawing of the embodiment, configurations similar to those of the above-described embodiment are denoted by the same reference numerals.

In the embodiment, the first and second sensor modules 2A, 2B are disposed such that the centers O overlap each other in a plan view from the c-axis direction. As shown in FIG. 13, in the first sensor module 2A, a plus side in the X-axis direction is directed to a plus side in the a-axis direction, a plus side in the Y-axis direction is directed to a plus side in the b-axis direction, and a plus side in the Z-axis direction is directed to a plus side in the c-axis direction. On the other hand, in the second sensor module 2B, a plus side in the X-axis direction is directed to a minus side in the a-axis direction, a plus side in the Y-axis direction is directed to a plus side in the b-axis direction, and a plus side in the Z-axis direction is directed to a minus side in the c-axis direction.

According to the third embodiment, the same effects as those of the first embodiment described above can also be achieved.

Fourth Embodiment

Figure 14:
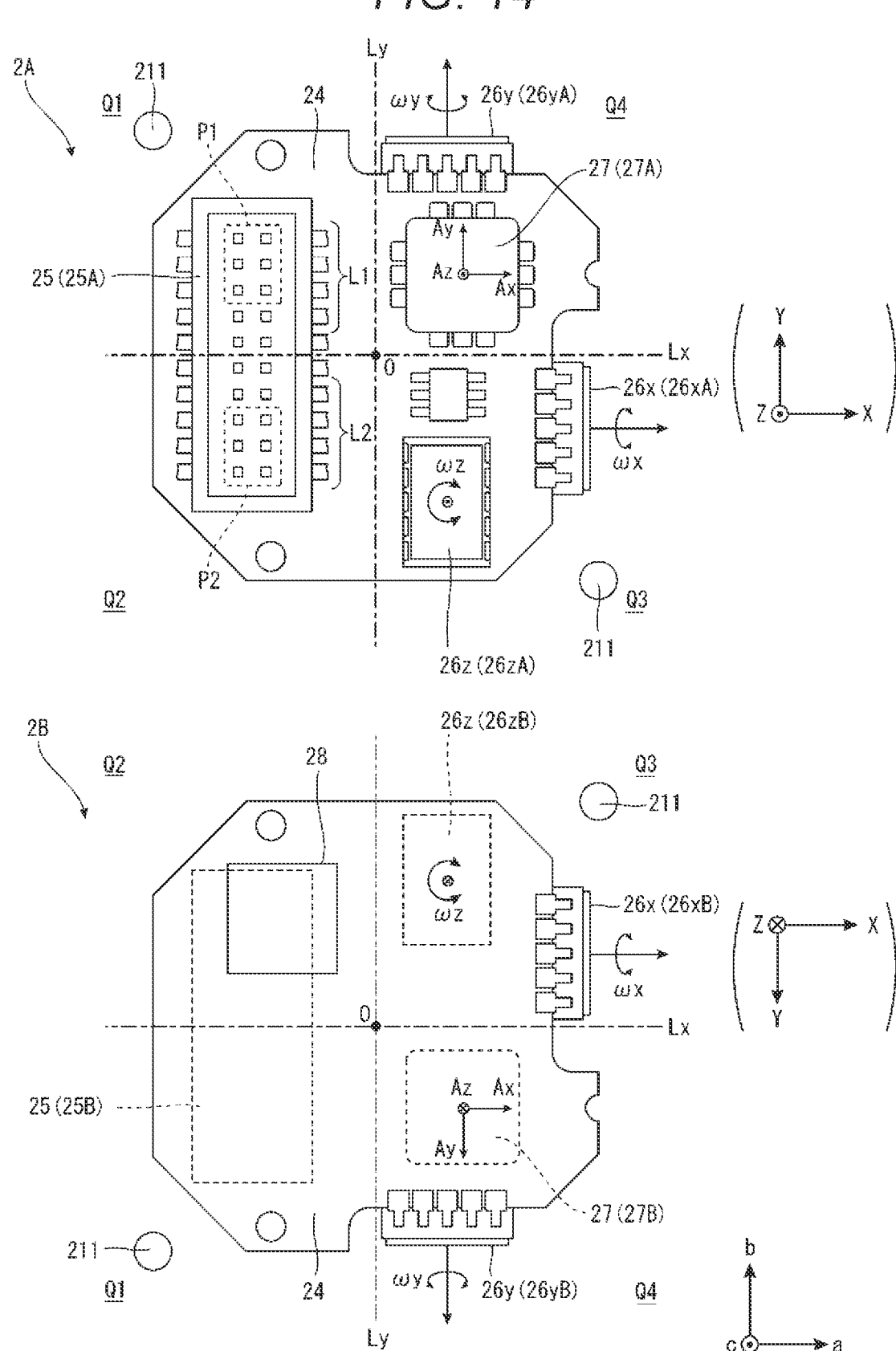
FIG. 14 is a plan view showing a positional relationship between a first sensor module and a second sensor module according to a fourth embodiment.

FIG. 14 is a plan view showing a positional relationship between a first sensor module and a second sensor module according to a fourth embodiment.

The sensor unit 1 according to the embodiment is the same as the sensor unit 1 according to the first embodiment described above except that arrangement of the first and second sensor modules 2A, 2B is different. In the following description, the sensor unit 1 according to the embodiment will be described focusing on differences from the first embodiment described above, and description of the same matters will be omitted. In the drawing of the embodiment, configurations similar to those of the above-described embodiment are denoted by the same reference numerals.

In the embodiment, the first and second sensor modules 2A, 2B are disposed such that the centers O overlap each other in a plan view from the c-axis direction. As shown in FIG. 14, in the first sensor module 2A, a plus side in the X-axis direction is directed to a plus side in the a-axis direction, a plus side in the Y-axis direction is directed to a plus side in the b-axis direction, and a plus side in the Z-axis direction is directed to a plus side in the c-axis direction. On the other hand, in the second sensor module 2B, a plus side in the X-axis direction is directed to a plus side in the a-axis direction, a plus side in the Y-axis direction is directed to a minus side in the b-axis direction, and a plus side in the Z-axis direction is directed to a minus side in the c-axis direction.

According to the fourth embodiment, the same effects as those of the first embodiment described above can also be achieved.

Although the sensor unit according to the aspect of the present disclosure has been described above based on the illustrated embodiments, the present disclosure is not limited thereto, and a configuration of each part can be replaced with any configuration having the same function. In addition, any other components may be added to the present disclosure.

For example, the sensor unit may include a plurality of sets of the first and second sensor modules 2A, 2B. At least one sensor module 2 may be provided in addition to the set of the first and second sensor modules 2A, 2B.

What is claimed is:

1. A sensor unit comprising:
a substrate including a first surface and a second surface, which are in a front and back relationship, and including a first coupling portion disposed on the first surface and a second coupling portion disposed on the second surface;
a first sensor module including a first coupled portion that is located on a side close to the first surface and that is coupled to the first coupling portion, a first acceleration sensor, and a first angular velocity sensor, the first coupled portion being disposed on the first surface; and
a second sensor module including a second coupled portion that is located on a side close to the second surface and that is coupled to the second coupling portion, a second acceleration sensor, and a second angular velocity sensor, the second coupled portion being disposed on the second surface,
wherein the first sensor module and the second sensor module are disposed such that a center of the first sensor module and a center of the second sensor module overlap each other in a plan view of the substrate, wherein
the first sensor module and the second sensor module overlap each other in the plan view of the substrate, and
when four quadrants are defined by a first virtual line and a second virtual line that intersect with the center of the first sensor module and are orthogonal to each other in the plan view of the substrate,
the first coupled portion and the second coupled portion overlap each other in one quadrant in the plan view of the substrate, and each of the first sensor module and the second sensor module include a common signal wiring that is disposed in the quadrant where the first coupled portion and the second coupled portion overlap each other and that is common to the first sensor module and the second sensor module, and an individual signal wiring that is disposed in a quadrant where the first coupled portion and the second coupled portion do not overlap and are individual to the first sensor module and the second sensor module.

2. The sensor unit according to claim 1, wherein
the first sensor module includes a first case that accommodates the first acceleration sensor and the first angular velocity sensor, and
the second sensor module includes a second case that accommodates the second acceleration sensor and the second angular velocity sensor.

3. The sensor unit according to claim 1, wherein
the first acceleration sensor and the second acceleration sensor are disposed in the same quadrant of the four quadrants.

4. The sensor unit according to claim 3, wherein
the first angular velocity sensor is disposed in a first quadrant of the four quadrants, and
the second angular velocity sensor is disposed in a quadrant different from the first quadrant of the four quadrants.

5. The sensor unit according to claim 3, wherein
the second angular velocity sensor is disposed in a quadrant located diagonally to the first quadrant of the four quadrants.

6. A sensor unit comprising:
a substrate including a first surface and a second surface, which are in a front and back relationship, and including a first coupling portion disposed on the first surface and a second coupling portion disposed on the second surface;
a first sensor module including a first coupled portion that is located on a side close to the first surface and that is coupled to the first coupling portion, a first acceleration sensor, and a first angular velocity sensor, the first coupled portion being disposed on the first surface; and
a second sensor module including a second coupled portion that is located on a side close to the second surface and that is coupled to the second coupling portion, a second acceleration sensor, and a second angular velocity sensor, the second coupled portion being disposed on the second surface, wherein
the first sensor module and the second sensor module overlap each other in a plan view of the substrate, and
when four quadrants are defined by a first virtual line and a second virtual line that intersect with a center of the first sensor module and are orthogonal to each other in the plan view of the substrate, the first acceleration sensor and the second acceleration sensor are disposed in the same quadrant of the four quadrants,
wherein
the first coupled portion and the second coupled portion overlap each other in one quadrant in the plan view of the substrate, and
each of the first sensor module and the second sensor module include a common signal wiring that is disposed in the quadrant where the first coupled portion and the second coupled portion overlap each other and that is common to the first sensor module and the second sensor module, and an individual signal wiring that is disposed in a quadrant where the first coupled portion and the second coupled portion do not overlap and are individual to the first sensor module and the second sensor module.

7. The sensor unit according to claim 6, wherein the first angular velocity sensor is disposed in a first quadrant of the four quadrants, and the second angular velocity sensor is disposed in a quadrant different from the first quadrant of the four quadrants.

8. The sensor unit according to claim 6, wherein the second angular velocity sensor is disposed in a quadrant located diagonally to the first quadrant of the four quadrants.

9. The sensor unit according to claim 6, wherein the first sensor module includes a first case that accommodates the first acceleration sensor and the first angular velocity sensor, and the second sensor module includes a second case that accommodates the second acceleration sensor and the second angular velocity sensor.

\* \* \* \* \*